United States Patent
Huang-Fu et al.

(10) Patent No.: US 11,160,123 B2
(45) Date of Patent: Oct. 26, 2021

(54) 5G SESSION MANAGEMENT HANDLING ON PSI MISMATCH

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Yu-Chieh Tien, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/593,016

(22) Filed: Oct. 4, 2019

(65) Prior Publication Data

US 2020/0113014 A1   Apr. 9, 2020

Related U.S. Application Data

(60) Provisional application No. 62/742,325, filed on Oct. 6, 2018.

(51) Int. Cl.
*H04B 7/212* (2006.01)
*H04W 76/11* (2018.01)
(Continued)

(52) U.S. Cl.
CPC ............. *H04W 76/11* (2018.02); *H04W 8/30* (2013.01); *H04W 12/06* (2013.01); *H04W 28/04* (2013.01);
(Continued)

(58) Field of Classification Search
CPC ..... H04W 76/10; H04W 76/11; H04W 80/10; H04W 76/30; H04W 76/25;
(Continued)

(56) References Cited

U.S. PATENT DOCUMENTS

2017/0339609 A1   11/2017   Youn et al.
2018/0279180 A1   9/2018   Lee et al.
(Continued)

FOREIGN PATENT DOCUMENTS

WO   WO2018127597 A1   1/2017
WO   WO2018145585 A1   2/2017

OTHER PUBLICATIONS

3GPP TS 24.501 V15.0.0 3rd Generation Partnership Project;Technical Specification Group Core Network and Terminals; Non-Access-Stratum (NAS) protocol for 5G System (5GS); (Jun. 2018).*

(Continued)

*Primary Examiner* — Joseph Arevalo
(74) *Attorney, Agent, or Firm* — Imperium Patent Works; Zheng Jin

(57) ABSTRACT

A method of handling PDU session identity (PSI) mismatch for PDU session procedures is proposed. In case a user equipment (UE) receives a 5G session management (5GSM) message in which the PSI value indicates that the PDU session is in 5GSM state PDU SESSION INACTIVE, the UE stays in its current 5GSM state for the PDU session and responds with a 5GSM status message including a 5GSM cause #43 "Invalid PDU session identity" to reduce signaling and UE handling effort. In case the UE receives a 5GSM message in which the PSI value is a reserved or an assigned value, the UE stays in its current 5GSM state for the PDU session and ignores the 5GSM message to reduce signaling.

16 Claims, 3 Drawing Sheets

(51) Int. Cl.
| | |
|---|---|
| *H04W 76/36* | (2018.01) |
| *H04W 76/10* | (2018.01) |
| *H04W 76/18* | (2018.01) |
| *H04W 76/30* | (2018.01) |
| *H04W 8/30* | (2009.01) |
| *H04W 28/04* | (2009.01) |
| *H04W 80/02* | (2009.01) |
| *H04W 12/06* | (2021.01) |
| *H04W 80/10* | (2009.01) |
| *H04W 80/12* | (2009.01) |

(52) U.S. Cl.
CPC ........... *H04W 76/10* (2018.02); *H04W 76/18* (2018.02); *H04W 76/30* (2018.02); *H04W 76/36* (2018.02); *H04W 80/02* (2013.01); *H04W 80/10* (2013.01); *H04W 80/12* (2013.01)

(58) Field of Classification Search
CPC . H04W 28/0268; H04W 76/18; H04W 76/22; H04W 76/27; H04W 68/005; H04W 76/20; H04W 8/08; H04W 12/06; H04W 28/04; H04W 36/0022; H04W 36/14; H04W 76/12; H04W 80/02; H04W 88/023; H04W 28/12; H04W 36/0033; H04W 36/0044; H04W 36/0079; H04W 48/04; H04W 48/16; H04W 48/18; H04W 56/001; H04W 60/00; H04W 64/003; H04W 76/19; H04W 76/34; H04W 76/36; H04W 80/12; H04W 88/06; H04W 8/30

USPC ......... 455/425; 370/329, 338, 252, 254, 392
See application file for complete search history.

(56) References Cited

U.S. PATENT DOCUMENTS

| | | | |
|---|---|---|---|
| 2018/0332467 A1 | 11/2018 | Tenny et al. | |
| 2019/0261449 A1* | 8/2019 | Kim | H04W 48/16 |
| 2020/0008268 A1* | 1/2020 | Huang-Fu | H04W 76/18 |
| 2020/0015311 A1* | 1/2020 | Kim | H04W 68/005 |
| 2020/0120561 A1* | 4/2020 | Huang-Fu | H04W 76/10 |

OTHER PUBLICATIONS

International Search Report and Written Opinion of International Search Authority for PCT/CN2019/109912 dated Jan. 2, 2020 (9 pages).
3GPP TS 24.501 V15.1.0 (Sep. 2018), 3rd Generation Partnership Project; Technical Specification Group Core Network and Terminals; Non-Access-Stratum (NAS) protocol for 5G System (5GS); Stage 3 (Release 15) sections 6, 7.3.
Taiwan IPO, office action for related TW patent application 108136257 (no English translation is available) dated Sep. 30, 2020 (7 pages).
Taiwan IPO, office action for related TW patent application 108136257 (no English translation is available) dated Apr. 16, 2021 (5 pages).
3GPP TS 24.501 V15.1.0 (Sep. 2018), 3rd Generation Partnership Project; Technical Specification Group Core Network and Terminals; Non-Access-Stratum (NAS) protocol for 5G System (5GS); Stage 3 (Release 15) *p. 173, 197, 203, 206, 239, 241*.

* cited by examiner

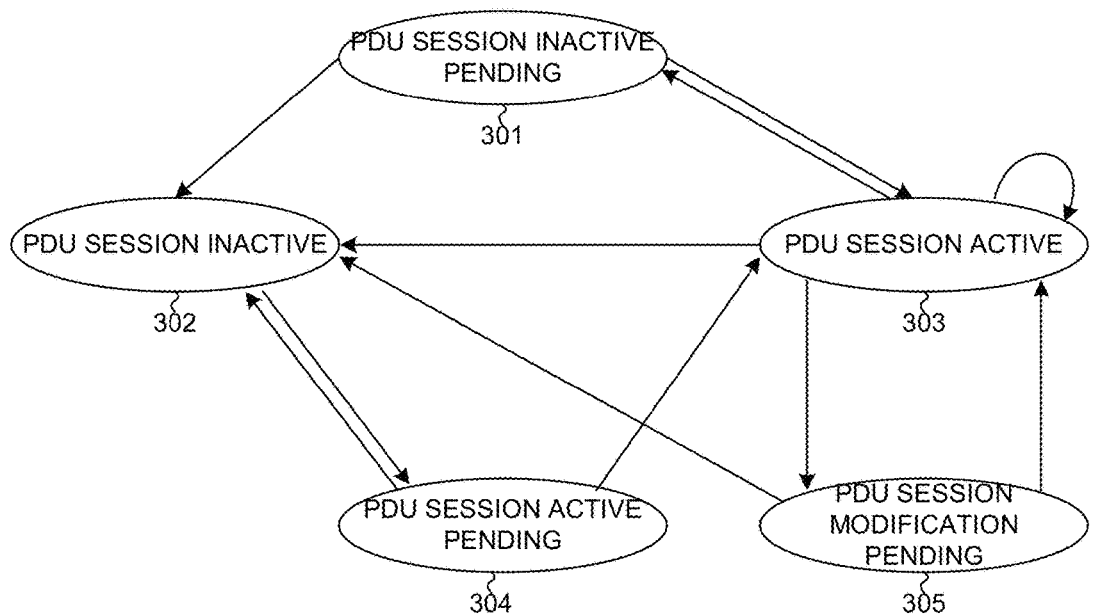

FIG. 3

| 5GSM MESSAGE FROM NETWORK TO UE | PSI value is Reserved/Unassigned | PSI indicates a PDU Session in INACTVE State |
|---|---|---|
| ESTABLISHMENT ACCEPT | ignore | 5GSM STATUS (#43) |
| ESTABLISHMENT REJECT | ignore | 5GSM STATUS (#43) |
| AUTHENTICATION COMMAND | ignore | 5GSM STATUS (#43) |
| AUTHENTICATION RESULT | ignore | 5GSM STATUS (#43) |
| MODIFICATION COMMAND | ignore | 5GSM STATUS (#43) |
| MODIFICATION REJECT | ignore | 5GSM STATUS (#43) |
| RELEASE COMMAND | ignore | 5GSM STATUS (#43) |
| RELEASE REJECT | ignore | 5GSM STATUS (#43) |

FIG. 4

5G SESSION MANAGEMENT HANDLING ON PSI MISMATCH

CROSS REFERENCE TO RELATED APPLICATIONS

This application claims priority under 35 U.S.C. § 119 from U.S. Provisional Application No. 62/742,325, entitled "5GSM Handling on 5G PSI Mismatch", filed on Oct. 6, 2018, the subject matter of which is incorporated herein by reference.

TECHNICAL FIELD

The disclosed embodiments relate generally to wireless communication, and, more particularly, to method of supporting enhanced PDU Session ID (PSI) mismatch handling in next generation 5G mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. Each PDU session is identified by a PDU session ID (PSI), and may include multiple QoS flows and QoS rules. The network/UE can initiate different PDU session procedures, e.g., PDU session establishment, PDU session modification, and PDU session release. Accordingly, for each PDU session, a UE can be in different 5G session management (5GSM) states during the different PDU session procedures. The different PDU session states include PDU session active state, inactive state, active pending state, inactive pending state, and modification pending state.

For the different PDU session procedures, the issue of PDU session ID mismatch needs to be handled properly. In one example, if the PDU session ID in a 5G session management (5GSM) message is a reserved or unassigned value, the proper UE behavior needs to be defined to reduce signaling and UE handling effort. In another example, for network initiated PDU session modification, if the PDU session ID in the PDU SESSION MODIFICATION COMMAND message belongs to a PDU session in PDU SESSION INACTIVE state in the UE, the proper UE behavior also needs to be defined to reduce signaling.

SUMMARY

A method of handling PDU session identity (PSI) mismatch for PDU session procedures is proposed. In case a user equipment (UE) receives a 5G session management (5GSM) message in which the PSI value indicates that the PDU session is in 5GSM state PDU SESSION INACTIVE, the UE stays in its current 5GSM state for the PDU session and responds with a 5GSM status message including a 5GSM cause #43 "Invalid PDU session identity" to reduce signaling and UE handling effort. In case the UE receives a 5GSM message in which the PSI value is a reserved or an assigned value, the UE stays in its current 5GSM state for the PDU session and ignores the 5GSM message to reduce signaling.

In one embodiment, a UE receives a 5G session management (5GSM) message from a network entity by a user equipment (UE) in a mobile communication network, wherein the 5GSM message corresponds to a Protocol Data Unit (PDU) session procedure associated with a PDU session identity (PSI). The UE determines whether the PSI value is valid for the corresponding PDU session procedure. Upon detecting the PSI value is unassigned or reserved, then the UE ignores the 5GSM message. Otherwise, upon detecting the PSI value indicates the PDU session is in PDU SESSION INACTIVE state, then the UE transmits a 5GSM status message to the network including a cause information element (IE).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates a simplified state machine with different UE states for PDU session establishment, release and modification procedures in accordance with embodiments of the current invention.

FIG. 4 illustrates examples of UE handling different PSI mismatch scenarios when UE receives network-initiated 5GSM messages.

DETAILED DESCRIPTION

Reference will now be made in detail to some embodiments of the invention, examples of which are illustrated in the accompanying drawings.

Figure 1:
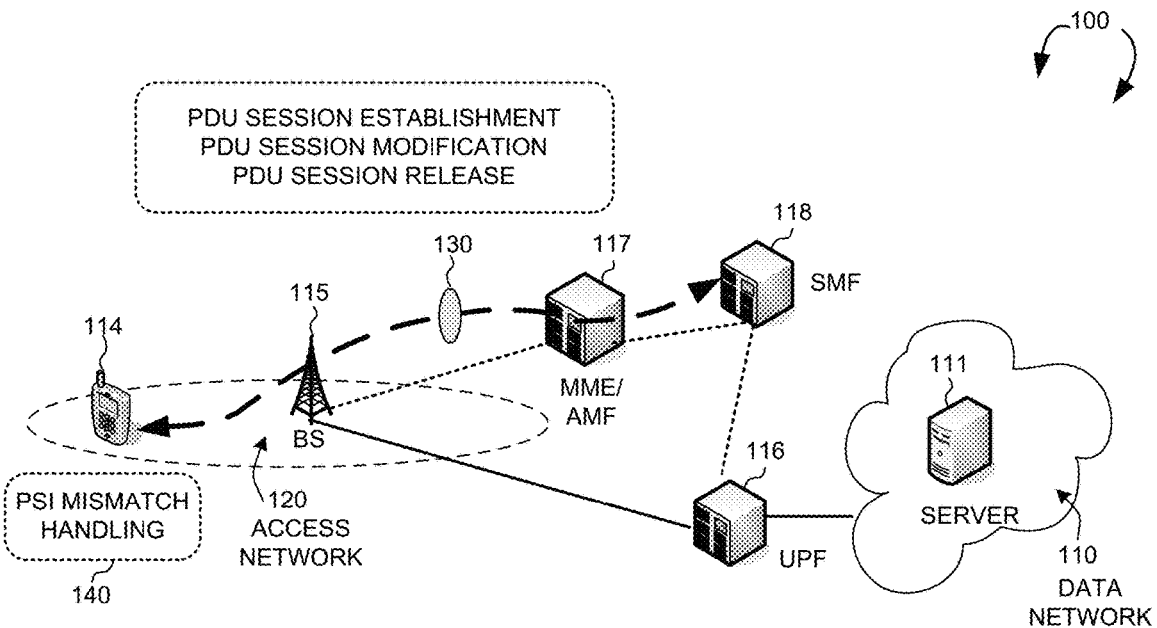
FIG. 1 illustrates an exemplary 5G new radio (NR) network supporting PDU Session Identity (PSI) mismatch in accordance with one novel aspect.

FIG. 1 illustrates an exemplary 4G LTE or 5G new radio (NR) network 100 supporting PDU Session Identity (PSI) mismatch in accordance with one novel aspect. LTE/NR network 100 comprises data network 110 and application server 111 that provides various services by communicating with a plurality of user equipments (UEs) including UE 114. In the example of FIG. 1, UE 114 and its serving base station BS 115 belong to part of a radio access network RAN 120.

RAN 120 provides radio access for UE 114 via a radio access technology (RAT). Application server 111 communicates with UE 114 through User Plane Function (UPF) 116 and BS 115. A mobility management entity (MME) or an access and mobility management function (AMF) 117 communicates with BS 115 for access and mobility management of wireless access devices in LTE/NR network 100. A Session Management Function (SMF) 118 is primarily responsible for interacting with the decoupled data plane, creating, updating and removing Protocol Data Unit (PDU) sessions and managing session context with UPF 116. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

In 5G/NR, a Protocol Data Unit (PDU) session defines the association between the UE and the data network that provides a PDU connectivity service. Each PDU session is identified by a. PDU session identity (PSI), and may include multiple QoS flows and QoS rules. The network or the UE can initiate different PDU session procedures, e.g., PDU session establishment, PDU session modification, and PDU session release procedures. Accordingly, for each PDU session, a UE can be in different 5G session management (5GSM) states during the different PDU session procedures. The different PDU session states include PDU session active state, inactive state, active pending state, inactive pending state, and modification pending state. For the different PDU session procedures (130), the issue of PDU session ID mismatch needs to be handled properly. In one example, if the PDU session ID in a 5GSM message is a reserved or an unassigned value, proper UE behavior needs to be defined. In another example, for network initiated PDU session modification procedure, if the PDU session ID in the PDU SESSION MODIFICATION COMMAND message belongs to a PDU session that is in PDU SESSION INACTIVE state in the UE, then proper UE behavior also needs to be defined to reduce signaling.

In accordance with one novel aspect, a method of PSI mismatch handling on PDU session procedures is proposed (as depicted by 140). In case the UE receives a PDU SESSION MODIFICATION COMMAND message (or other 5GSM message) in which the PSI value indicates that the PDU session is in 5GSM state PDU SESSION INACTIVE, the UE stays in the current 5GSM modification pending state (or other current 5GSM state) for the PDU session. The UE responds with a 5GSM STATUS message including a 5GSM cause #43 "Invalid PDU session identity", so that the network is aware of the PSI mismatch issue. As a result, the network can reduce retry signaling with the mismatched PSI; instead, the network can retransmit the 5GSM message with a valid PSI. In addition, when the network receives this error cause, the network can also do PDU session alignment accordingly, and thus avoid further PSI mismatch operations. By sending the 5GSM status message, the 5GSM status is not impacted. Therefore, the UE can proceed with the current procedure without being aborted due to unexpected messages. In case the UE receives a 5GSM message in which the PSI value is a reserved or an assigned value, the UE stays in its current 5GSM state for the PDU session and ignores the 5GSM message, so there's no extra UE signaling and handling effort. By ignoring such exception case, there is no UE impact on any NAS procedure.

Figure 2:
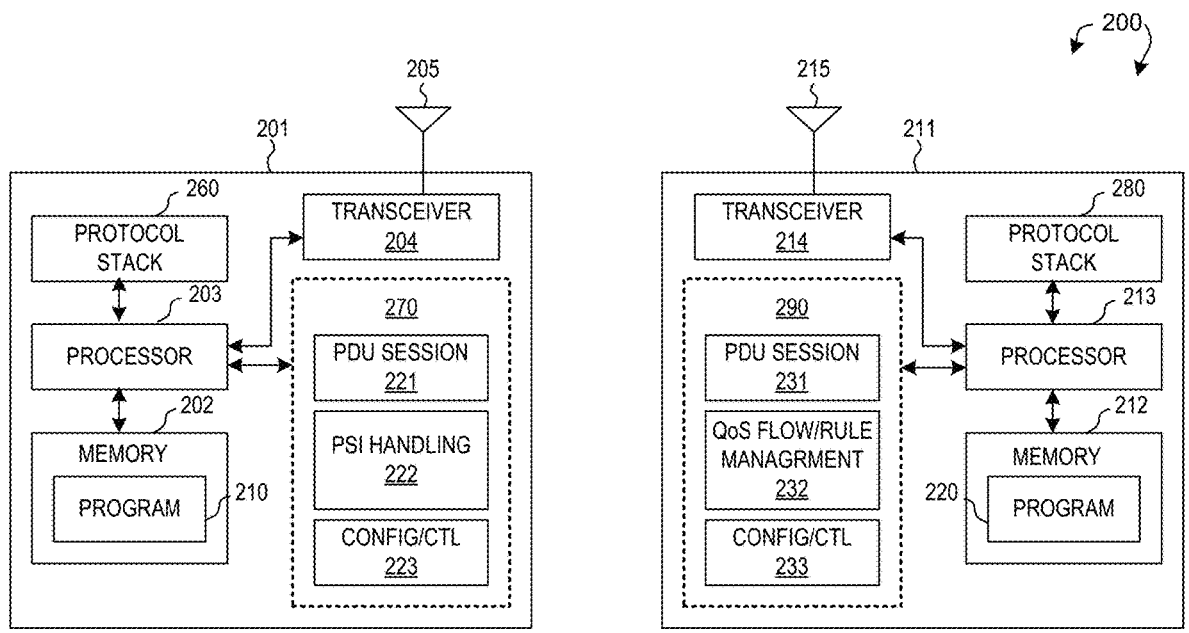
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session handling circuit 231 handles PDU session establishment and modification procedures. QoS flow and rule management circuit 232 creates, modifies, and deletes QoS flows and QoS rules for UE. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a PSI handling circuit 222 that manages PSI for corresponding procedure, and handles PTI mismatch accordingly, and a config and control circuit 223 that handles configuration and control parameters from the network.

FIG. 3 illustrates a simplified state machine with different UE states for PDU session establishment, release, and modification procedures in accordance with embodiments of the current invention. For each PDU session, a UE can be in many different 5GSM states at different stages of the PDU establishment and modification procedure. From PDU session inactive pending state (301), UE can go to PDU session inactive state (302) if UE receives a PDU SESSION RELEASE COMMAND message, UE can also go to PDU session active state (303) if UE receives a PDU SESSION RELEASE REJECT message. From PDU session inactive state (302), UE can go to PDU session active pending state (304) when UE sends out a PDU SESSION ESTABLISHMENT REQUEST message. From PDU session active pending state (304), UE can go to PDU session inactive if UE receives a PDU SESSION ESTABLISHMENT REJECT message, UE can also go to PDU session active state (303) if UE receives PDU SESSION ESTABLISHMENT ACCEPT message. From PDU session active state (303), UE can possibly go to other three states or remain in active state. For example, UE can go to PDU session modification pending state (305) when UE sends out a PDU SESSION MODIFICATION REQUEST message. From PDU session modification pending state (305), UE can go to PDU session inactive state (302) if UE receives a PDU SESSION MODIFICATION REJECT message, UE can go to PDU session active state (303) if UE receives a PDU SESSION MODIFICATION COMMAND message or a PDU SESSION MODIFICATION REJECT message.

Note that this state machine does not illustrates all possible UE states and associated state transactions for the PDU session and procedures. However, the state machine defines some of the UE behaviors when UE is in certain states and receives or sends certain 5GSM messages. For example, if UE is in PDU session modification pending state (305), and UE receives a PDU SESSION MODIFICATION COMMAND message, and the PDU session ID in the PDU SESSION MODIFICATION COMMAND message belongs to a PDU session in PDU session inactive state, UE could respond to the network with a PDU SESSION MODIFICATION COMMAND REJECT message, and either go to active state or remains in its current state. If UE goes to active state, then it would be a problem if the network resends the command message with a matching PSI value. If UE remains in the current state, then it would be a problem if the network does not resend the command message. In one novel aspect, UE responds with a 5GSM STATUS message including a 5GSM cause #43 "Invalid PDU session identity" and remains in its current state for the PDU session. In another example, if UE receives a network-initiated 5GSM message with a PSI value that is reserved or unassigned, UE remains in its current 5GSM state, and ignores the 5GSM command message.

FIG. 4 illustrates examples of UE handling different PSI mismatch scenarios when UE receives network-initiated 5GSM messages. As depicted in table 400 of FIG. 4, the first column lists a number of network-initiated 5GSM messages sent to UE, which includes PDU SESSION ESTABLISHMENT ACCEPT, PDU SESSION ESTABLISHMENT REJECT, PDU SESSION AUTHENTICATION COMMAND, PDU SESSION AUTHENTICATION RESULT, PDU SESSION MODIFICATION COMMAND, PDU SESSION MODIFICATION REJECT, PDU SESSION RELEASE COMMAND, and PDU SESSION RELEASE REJECT. The second column represents UE behavior when the PSI value of the 5GSM message is reserved or unassigned—UE ignores the 5GSM message. Under this scenario, the 5GSM message has an invalid PSI value, and the UE should simply ignore without sending 5GSM status with cause value, to reduce signaling and UE handling effort. The third column represents UE behavior when the PSI indicates a PDU session in 5GSM state PDU SESSION INACTIVE—UE responds with a 5GSM status message including a 5GSM cause #43 "Invalid PDU session identity". Under this scenario, the 5GSM message has PSI mismatch, which indicates that the network and the UE are unsynchronized. As a result, UE should send a 5GSM status message and let the network know, to prevent the network from keep retrying sending the same 5GSM message with the mismatched PSI value.

Figure 5:
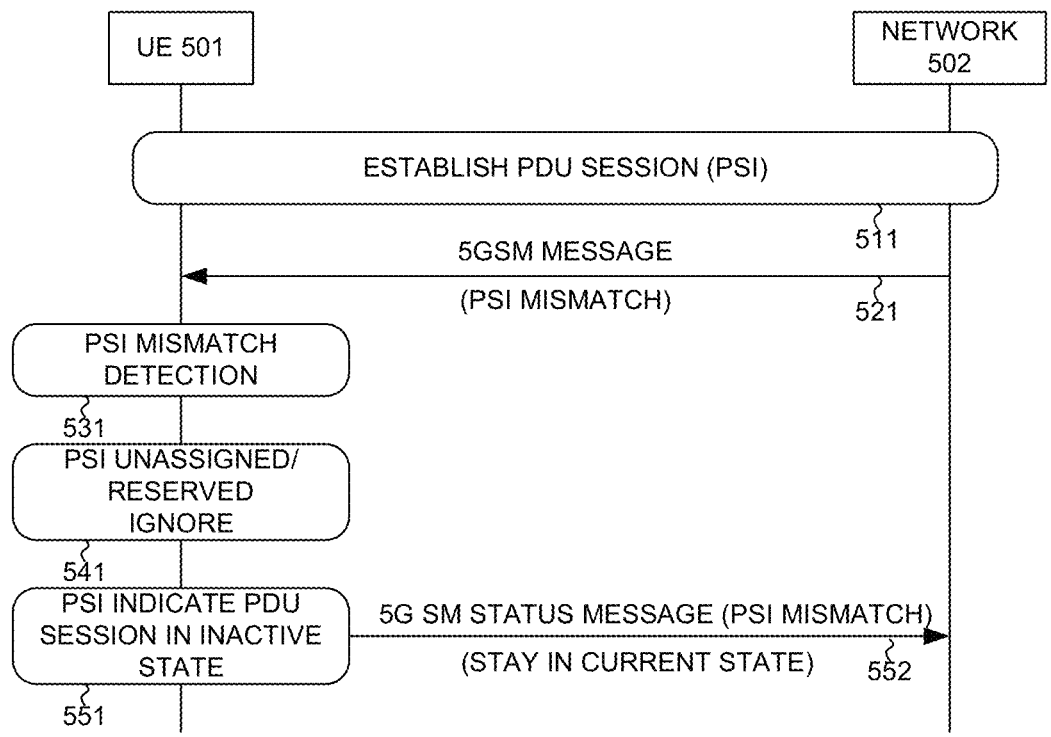
FIG. 5 illustrates a sequence flow of PSI mismatch handling for PDU session procedures in accordance with embodiments of the current invention.

FIG. 5 illustrates a sequence flow of PSI mismatch handling for PDU session procedures in accordance with embodiments of the current invention. In step 511, UE 501 and network 502 establish a PDU session having a PDU session identity (PSI). Note that network 502 refers to any network entity in the 5G network including a base station, an AMF, or an SMF. The network/UE can initiate different PDU session procedures, e.g., PDU session establishment, PDU session modification, and PDU session release. Accordingly, for each PDU session, a UE can be in different 5G session management (5GSM) states during the different PDU session procedures. The different PDU session states include PDU session active state, inactive state, active pending state, inactive pending state, and modification pending state.

In step 521, network 502 sends a 5GSM message to UE 501. The 5GSM message is related to a PDU session procedure identified by a PSI value. The 5GSM message can be any of the messages listed in FIG. 4, which include PDU SESSION ESTABLISHMENT ACCEPT, PDU SESSION ESTABLISHMENT REJECT, PDU SESSION AUTHENTICATION COMMAND, PDU SESSION AUTHENTICATION RESULT, PDU SESSION MODIFICATION COMMAND, PDU SESSION MODIFICATION REJECT, PDU SESSION RELEASE COMMAND, and PDU SESSION RELEASE REJECT. However, the 5GSM may have a PSI mismatch issue. In step 531, upon receiving the 5GSM message, UE 501 determines whether there is any PSI mismatch issue. This may involve checking whether the PSI value is valid, e.g., whether it is a reserved or unassigned value and does not match any established PDU session. It may also involve checking whether the PSI value belongs to any PDU session in 5GSM state of PDU SESSION INACTIVE, e.g., whether the PDU session is not supposed to receive any 5GSM message and perform any PDU session procedure.

In step 541, UE 501 determines that PSI value carried by the 5GSM message is a reserved or unassigned value, and does not match any existing PDU session. In response, UE 501 ignores the 5GSM message and stays in the current 5GSM state for PDU sessions. UE 501 does not send any 5GSM status message to the network. Since there is no 5GSM state machine for a PSI of unassigned or reserved value, ignoring the message can further reduce the UE effort of sending a 5GSM status message, e.g., UE can completely avoid effort on this exception case, without impact any NAS procedure or 5GSM state. In step 551, UE 501 determines that the PSI value carried by the 5GSM message indicates the corresponding PDU session is in PDU SESSION INACTIVE state. In response, UE 501 sends a 5GSM status message with 5GSM cause IE to #43 "Invalid PDU session identity" and stays in the current 5GSM stat for PDU session. As a result, the network is aware of the PSI mismatch between the network and the UE, which can reduce unnecessary retry signaling using the same invalid PSI value. For example, if the network receives a 5GSM message with PSI=2 and the network receives a 5GSM status message with #43 "Invalid PDU session identity" from the UE, the network can locally release the PDU session with PSI=2. The network can also include a PDU session status IE in the REGISTRATION ACCEPT message for the purpose of PDU session synchronization.

Figure 6:
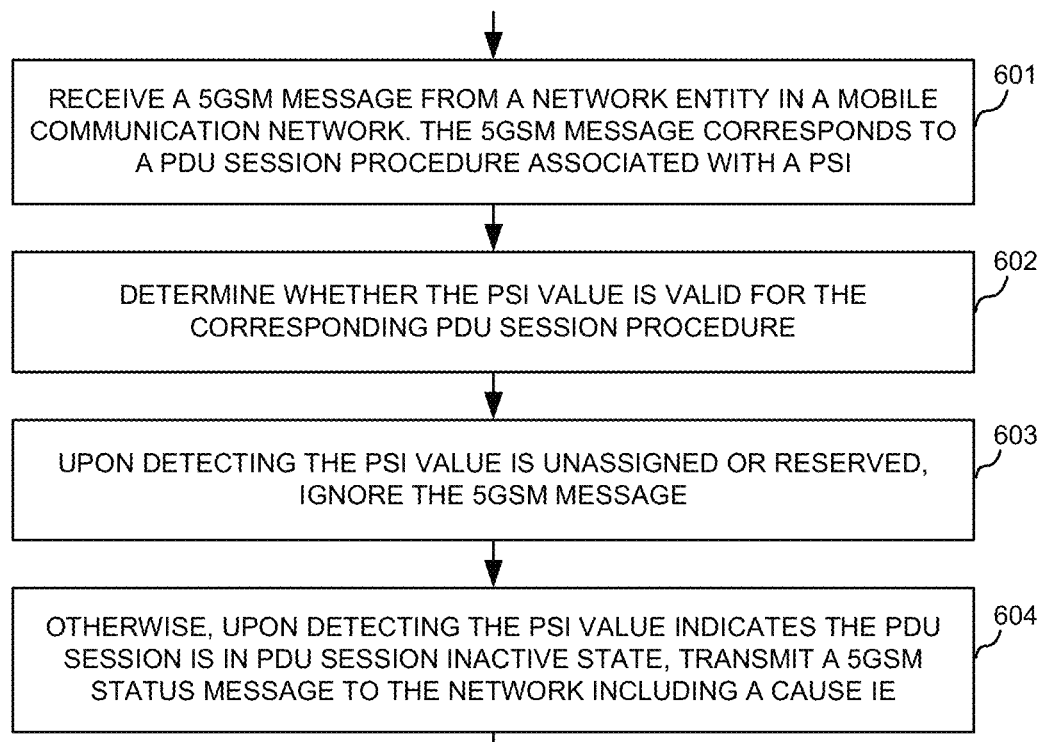
FIG. 6 is a flow chart of a method of supporting PSI mismatch handling for 5G NR networks in accordance with one novel aspect.

FIG. 6 is a flow chart of a method of supporting PSI mismatch handling for 5G NR networks in accordance with one novel aspect. In step 601, a UE receives a 5G session management (5GSM) message from a network entity by a user equipment (UE) in a mobile communication network, wherein the 5GSM message corresponds to a Protocol Data Unit (PDU) session procedure associated with a PDU session identity (PSI). In step 602, the UE determines whether the PSI value is valid for the corresponding PDU session procedure. In step 603, upon detecting the PSI value is unassigned or reserved, then the UE ignores the 5GSM message. Otherwise, in step 604, upon detecting the PSI value indicates the PDU session is in PDU SESSION INACTIVE state, then the UE transmits a 5GSM status message to the network including a cause information element (IE).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a 5G session management (5GSM) message from a network entity by a user equipment (UE) in a mobile communication network, wherein the 5GSM message corresponds to a Protocol Data Unit (PDU) session procedure associated with a PDU session identity (PSI);
   determining whether the PSI value is valid for the corresponding PDU session procedure;
   upon detecting the PSI value is unassigned or reserved, then the UE ignores the 5GSM message; and
   otherwise, determining a PSI mismatch for the PDU session procedure upon detecting the PSI value indicates the PDU session is in PDU SESSION INACTIVE state, then the UE transmits a 5GSM status message to the network including a cause information element (IE) in response to the PSI mismatch.

2. The method of claim 1, wherein the 5GSM status message contains a cause value that indicates "invalid PDU session identity".

3. The method of claim 1, wherein the UE remains in a current PDU session state upon transmitting the 5GSM status message.

4. The method of claim 1, wherein the 5GSM message comprises a PDU SESSION ESTABLISHMENT ACCEPT message, a PDU SESSION ESTABLISHMENT REJECT message, a PDU SESSION AUTHENTICATION COMMAND message, a PDU SESSION AUTHENTICATION RESULT message, a PDU SESSION MODIFICATION COMMAND message, a PDU SESSION MODIFICATION REJECT message, a PDU SESSION RELEASE COMMAND message, and a PDU SESSION RELEASE REJECT message.

5. The method of claim 1, wherein the UE ignores the 5GSM message and remains in a current PDU session state without transmitting any 5GSM status message.

6. The method of claim 1, wherein the 5GSM message comprises a PDU SESSION MODIFICATION COMMAND message, and the PSI value indicates the PDU session is in PDU SESSION INACTIVE state.

7. The method of claim 6, wherein the UE remains in PDU SESSION MODIFICATION PENDING state upon transmitting the 5GSM status message.

8. The method of claim 7, wherein the UE receives another PDU SESSION MODIFICATION COMMAND message with another PSI value that indicates the PDU session is in PDU SESSION MODIFICATION PENDING state.

9. A User Equipment (UE), comprising:
   a receiver that receives a 5G session management (5GSM) message from a network entity in a mobile communication network, wherein the 5GSM message corresponds to a Protocol Data Unit (PDU) session procedure associated with a PDU session identity (PSI);
   a PSI handling circuit that determines whether the PSI value is valid for the corresponding PDU session procedure;
   a transmitter that transmits a 5GSM status message to the network including a cause information element (IE) upon determining a PSI mismatch for the PDU session procedure in response to detecting the PSI value indicates the PDU session is in PDU SESSION INACTIVE state, wherein the UE ignores the 5GSM message upon detecting the PSI value is unassigned or reserved.

10. The UE of claim 9, wherein the 5GSM status message contains a cause value that indicates "invalid PDU session identity".

11. The UE of claim 9, wherein the UE remains in a current PDU session state upon transmitting the 5GSM status message.

12. The UE of claim 9, wherein the 5GSM message comprises a PDU SESSION ESTABLISHMENT ACCEPT message, a PDU SESSION ESTABLISHMENT REJECT message, a PDU SESSION AUTHENTICATION COMMAND message, a PDU SESSION AUTHENTICATION RESULT message, a PDU SESSION MODIFICATION COMMAND message, a PDU SESSION MODIFICATION REJECT message, a PDU SESSION RELEASE COMMAND message, and a PDU SESSION RELEASE REJECT message.

13. The UE of claim 9, wherein the UE ignores the 5GSM message and remains in a current PDU session state without transmitting any 5GSM status message.

14. The UE of claim 9, wherein the 5GSM message comprises a PDU SESSION MODIFICATION COMMAND message, and the PSI value indicates the PDU session is in PDU SESSION INACTIVE state.

15. The UE of claim 14, wherein the UE remains in PDU SESSION MODIFICATION PENDING state upon transmitting the 5GSM status message.

16. The UE of claim 15, wherein the UE receives another PDU SESSION MODIFICATION COMMAND message with another PSI value that indicates the PDU session is in PDU SESSION MODIFICATION PENDING state.

* * * * *